(No Model.)  3 Sheets—Sheet 1.
S. G. LINDSEY.
AMALGAMATOR.
No. 272,564.  Patented Feb. 20, 1883.
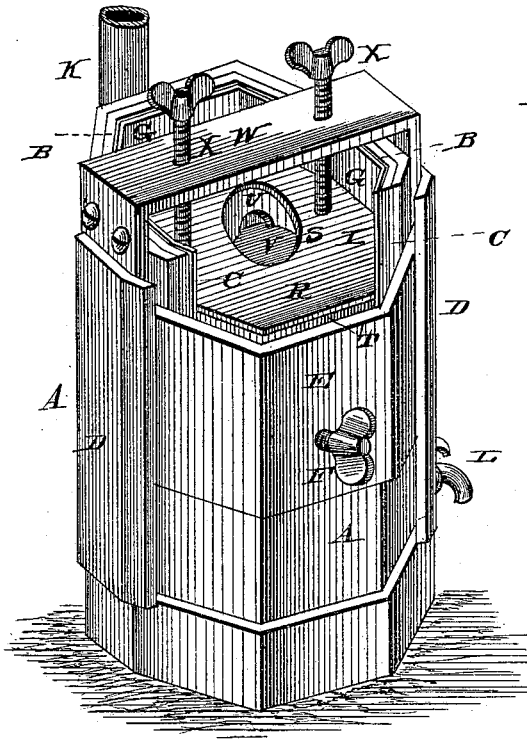
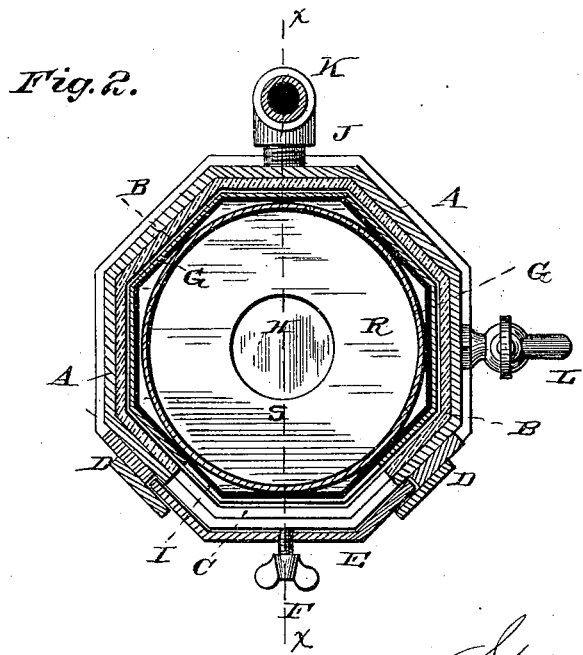
WITNESSES:  INVENTOR.
Stephen G. Lindsey,
by C. A. Snow & Co.
ATTORNEYS.

(No Model.)  3 Sheets—Sheet 2.
S. G. LINDSEY.
AMALGAMATOR.
No. 272,564.  Patented Feb. 20, 1883.
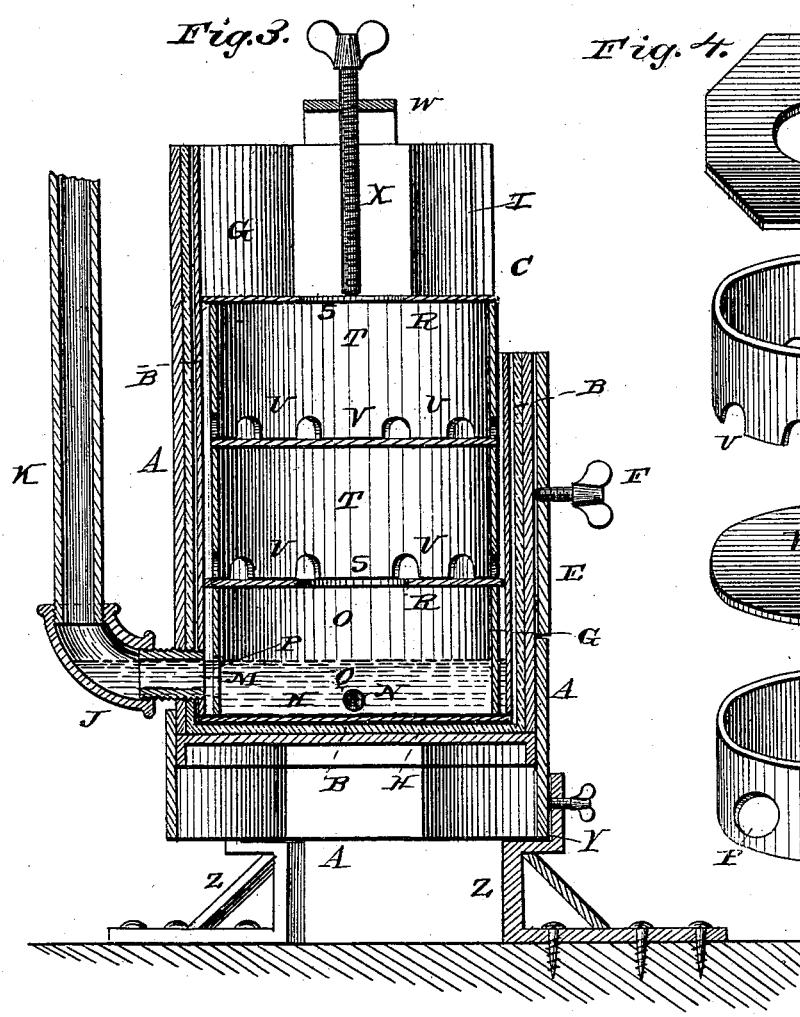
WITNESSES:
INVENTOR.
Stephen G. Lindsey,
by C. A. Snow & Co.
ATTORNEYS.

(No Model.) 3 Sheets—Sheet 3.
S. G. LINDSEY.
AMALGAMATOR.
No. 272,564. Patented Feb. 20, 1883.
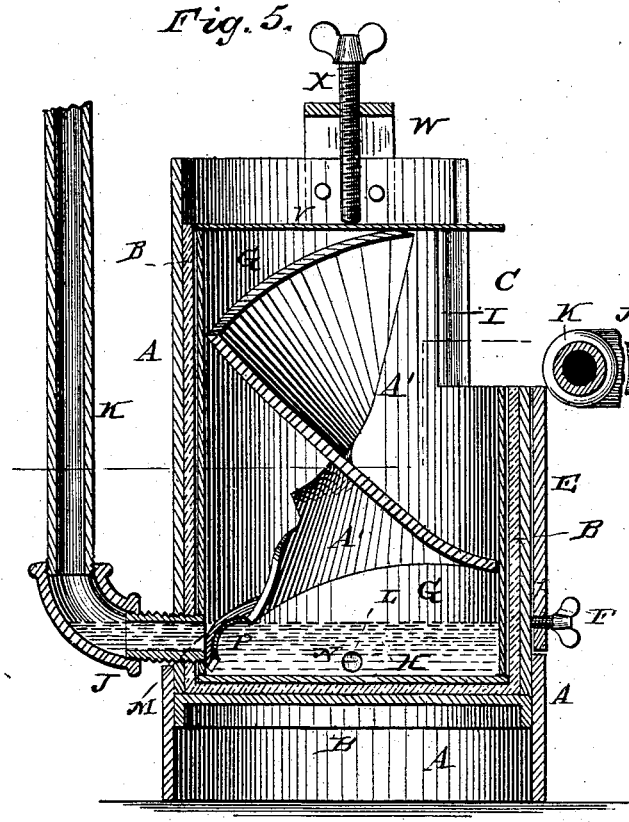
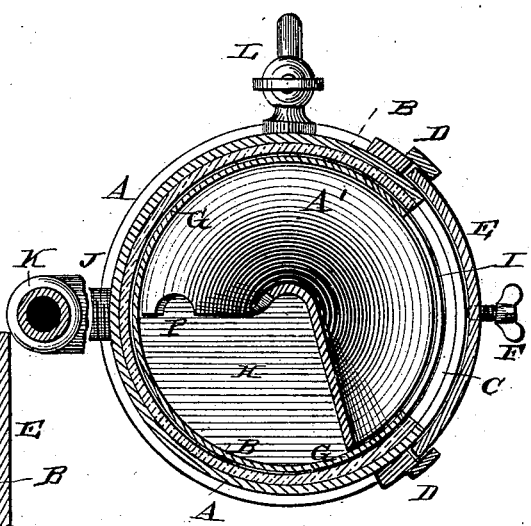
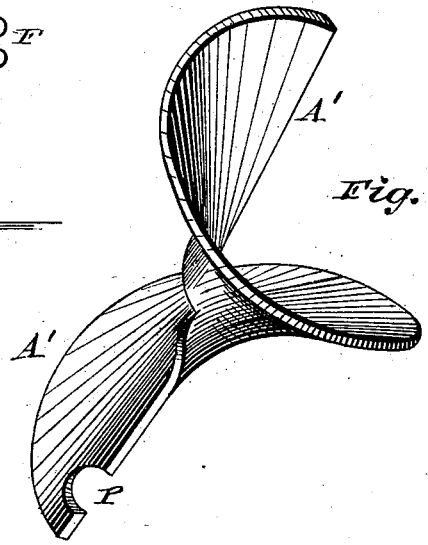
WITNESSES:
INVENTOR.
Stephen G. Lindsey
by C. A. Snow & Co.
ATTORNEYS.

UNITED STATES PATENT OFFICE.

STEPHEN G. LINDSEY, OF SALT LAKE CITY, UTAH TERRITORY.

AMALGAMATOR.

SPECIFICATION forming part of Letters Patent No. 272,564, dated February 20, 1883.

Application filed May 12, 1882. (No model.)

*To all whom it may concern:*

Be it known that I, STEPHEN G. LINDSEY, of Salt Lake City, in the county of Salt Lake and Territory of Utah, have invented certain new and useful Improvements in Amalgamators; and I do hereby declare that the following is a full, clear, and exact description of the invention, which will enable others skilled in the art to which it appertains to make and use the same, reference being had to the accompanying drawings, which form a part of this specification.

Figure 1 is a perspective view of my improved amalgamator. Fig. 2 is a horizontal sectional view. Fig. 3 is a vertical sectional view on the line $x\ x$ in Fig. 2. Fig. 4 shows in perspective the inner plates and shells detached. Fig. 5 is a vertical sectional view illustrating a modification. Fig. 6 is a horizontal sectional view of the same, and Fig. 7 is a detail view.

Corresponding parts in the several figures are denoted by like letters of reference.

This invention relates to amalgamators for separating precious metals from their ores; and it consists in certain improvements in the construction of the same, which will be hereinafter fully described, and particularly pointed out in the claims.

In the drawings hereto annexed, A represents a tank or vessel of suitable dimensions, and either angular in shape, as in Figs. 1, 2, and 3, (where it is shown as octagonal,) or cylindrical, as in Figs. 5 and 6. This tank may be made of iron or any suitable material; but I prefer to provide it with a lining, B, of glass, which enables the amalgam to be readily removed, as it will readily leave the glass, while it has always a tendency to adhere to metal. The upper end of one side of the tank is cut away, so as to form an opening, C, adjoining which are placed vertical flanges D, forming guides for a sliding door, E, adjustable at any desired height by a set-screw, F, so as to partially cover the opening C.

Inside the tank or vessel A is placed an amalgamated copper shell, G, conforming in shape to the interior of said tank, and a loose amalgamating bottom plate, H. The shell G has an opening, I, corresponding with the opening C in the tank A. The latter is provided near its lower end with an elbow, J, to which is connected the pipe K, through which the ore pulp or gold-bearing dirt is fed into the machine from some suitable reservoir located at a height sufficient to give the desired head or pressure. At the bottom of tank A is located a stop-cock, L. The shell G is provided with openings M N, registering with the elbow-pipe J and stop-cock L. The pipe K may be in one or in several pieces, joined by suitable couplings.

When the tank A is angular, as in Figs. 1, 2, and 3, I arrange within the same a series of amalgamating-shells and partition-plates, as follows: In the bottom, upon the loose plate H, I place a cylindrical shell, O, nicely fitting in the tank, (or in shell G,) and provided with openings P Q, registering with the openings M N. On top of the shell O, I place an angular (in this case an octagonal) plate or diaphragm, R, fitting closely in the shell G, and having a central opening, S, of suitable size to admit of the passage of the ore pulp or other substance. Upon the diaphragm R, I place a second cylindrical shell, T, provided at its lower edge with a series of notches, U, corresponding and registering with the angles of the tank. Upon the upper edge of the shell T, I place a circular imperforate plate or diaphragm, V. On this is placed another cylindrical shell, T, having notches U, and then another angular diaphragm, R, having opening S. Additional shells and diaphragms may be used in the order named, provided only that one of the angular perforated diaphragms shall come on top.

The upper end of the tank A has a crosspiece or bridge, W, in which set-screws X are adjustable, to press down upon the upper diaphragm, R, and thus hold or bind the several shells and diaphragms in their proper position.

In operation a suitable quantity of mercury—any surplus of which may be drawn off through the cock L—is placed in the tank, which latter, it should be stated, may in practice be supported in angular recesses Y in the legs or brackets Z, one of which is provided with a set-screw to hold the tank securely in position. Ore pulp, or dirt mixed with water, is then fed into the machine through the pipe K J and openings M P, thus entering the shell O at the bottom of the tank. Being forced through the quicksilver, it then passes upward through the opening S in the diaphragm R into the shell T, which being filled, it passes through the notches U into the angles of the casing between the shells G and T, thence upward until it strikes the corners of the next angular plate R, by which it is arrested and forced through the notches U into the upper shell, T, and thence out through the opening S in the upper diaphragm, R. When additional shells and diaphragms are used, a similar course is pursued until the exit S is reached, from whence the wash escapes or overflows through the opening C in the upper end of the casing, the point of overflow being regulated by the door E. In this manner the ore is thoroughly amalgamated and the particles of precious metal caused to adhere to the amalgamating plates and shells G H O R T V, from whence they may be afterward separated, as well as from the mercury, by any ordinary well-known process.

When the round or cylindrical tank A (shown in Figs. 5 and 6) is used, I dispense with the shells and plates O R T V and substitute for the same a spiral amalgamating-plate, A', along which the pulp ascends until the exit or overflow is reached. The object of this spiral plate, as well as of the parts O R T V, is to check the passage of the pulp and insure a thorough amalgamation.

Having thus described my invention, I claim and desire to secure by Letters Patent of the United States—

1. In an amalgamator, the tank A, having opening C, flanges D, and sliding door E, adjustable by the set-screw F, as and for the purpose set forth.

2. In an amalgamator, the combination, with the tank A, having feed-pipes K J, cock L, opening C, and adjustable door E, of the amalgamating-shell G, bottom plate, H, and adjustable amalgamating plates and shells O R T V, arranged in the order named, so as to check the passage of pulp, as described, for the purpose set forth.

3. The combination, with the angular tank A, of the shell G, plate H, and the shells and diaphragms O R T V, all constructed and arranged substantially as herein described.

4. The combination and arrangement, as described, of the tank A, having opening C, adjustable door E, and feed-pipe J, the shells and plates G H O R T V, and the bridge-piece W, having set-screws X, as and for the purpose set forth.

In testimony that I claim the foregoing as my own I have hereto affixed my signature in presence of two witnesses.

STEPHEN G. LINDSEY.

Witnesses:
WM. BAGGER,
GEO. F. GRAHAM.